May 4, 1937. J. F. HALSTEAD Re. 20,355

CIGAR WRAPPING MECHANISM

Original Filed April 14, 1928 3 Sheets-Sheet 1

Inventor
John F. Halstead
by
George S. Hastings
Attorney

May 4, 1937. J. F. HALSTEAD Re. 20,355

CIGAR WRAPPING MECHANISM

Original Filed April 14, 1928 3 Sheets-Sheet 2

Inventor
John F. Halstead
by
George S. Hastings
Attorney

May 4, 1937. J. F. HALSTEAD Re. 20,355

CIGAR WRAPPING MECHANISM

Original Filed April 14, 1928 3 Sheets-Sheet 3

Inventor
John F. Halstead
by
George S. Hasting
Attorney

Reissued May 4, 1937

Re. 20,355

UNITED STATES PATENT OFFICE 20,355

CIGAR-WRAPPING MECHANISM

John F. Halstead, Brooklyn, N. Y., assignor to International Cigar Machinery Company, a corporation of New Jersey Original No. 1,915,277, dated June 27, 1933, Serial No. 270,094, April 14, 1928. Application for reissue April 16, 1935, Serial No. 16,660

19 Claims. (Cl. 131—45)

This invention relates to cigar wrapping mechanism for cigar machines, the object of the present improvements being to overcome some of the shortcomings of former devices for this purpose, and thereby not only produce more perfect cigars, but also make the device more convenient for the operator to adjust.

A wrapping mechanism for a modern cigar machine, such as that to which the present invention is applied, consists of a gear driven set of longitudinal rollers, comprising a pair of top rollers and a pair of side rollers, between which the shaped cigar bunch is automatically inserted and in and by which it is rolled around while the wrapper is being fed to its circumference; of a stationary set of conical tuck rollers, usually three in number, which support the rear or tuck end of the cigar while being rolled; of an adjustable conical head or flag roller for wrapping the head end of the cigar, which end is supported in a stationary header block during the wrapping operation; of a cam operated tuck positioning device for properly adjusting the cigar bunch inserted into the rolling unit longitudinally; of a cam operated tuck needle which holds the entering end of the wrapper against the tuck end of the cigar bunch; of a cam actuated flag cutting mechanism which nicks the head end of the wrapper and thus forms the "flag" for wrapping the tip of the cigars; and of a cam operated wrapper tensioning device, which guides the wrapper to the cigar bunch and keeps it under tension by holding it against the wrapper carrier and which transfers the wrapper from the wrapper die, in which it is cut to shape, to the wrapping device, while being wound around the bunch. The longitudinal rollers are provided with a mechanism for opening and closing the same, so as to spread them apart for admitting the unwrapped bunch and for allowing the finished cigar to be taken out by suitable transfer arms. The drive of the longitudinal rollers is arranged to be adjustable in two positions, so as to enable running the device at either of two speeds best suited to the quality and condition of the wrapper used. Besides the interchangeable parts mentioned, the tuck roller assembly and the header block are made especially for each cigar shape.

In former cigar wrapping devices, the side rollers were spaced closer together than the top rollers, thereby producing a resulting upward pressure on the cigar which causes it to rise during the rolling operation unless counterbalanced by an excessive pressure on the top rollers, in either case changing the shape of the bunch and rendering the wrapper defective. By spacing the rollers symmetrically with respect to the horizontal axis of the cigar, this upward pressure is eliminated and the bunch will retain its position without causing the top rollers to exert an injurious pressure on the bunch and wrapper.

Furthermore, in previous cigar wrapping devices, each pair of rollers, that is to say the top roller and side roller on each side of the cigar, were mounted together on one arm and swung from a separate center for each side so, that in the case of inaccurate workmanship or wear, only one roller of each pair would bear on the cigar bunch, causing the latter to depart from its circular shape while being wrapped. By mounting all the longitudinal rollers on a common center and pivoting each top roller separately on the respective side roller, all rollers can be independently adjusted for perfect wrapping. Thus, the device can be adjusted either with greater pressure on the forward or on the rear top roller, or with equal pressure on both, as may be desired in each individual case.

With the old arrangement, the longitudinal rollers being fixed with respect to the center axis of the cigar, the latter rolling on its surface, will turn on the axis of its cylindrical body, and since during the wrapping operation its ends are held in fixed positions by the stationary header block at one end and by the fixed tuck rollers at the other, the ends of the cigar are liable to damage unless they are exactly concentric with the cigar axis. In the present device, the longitudinal rollers due to their resilient or semi-floating mounting, can give in the case of eccentric ends, so that the cigar then rolls or wobbles about the axis through the eccentric ends, and no damage to the ends will result from the eccentricity of the bunch.

Again, in former cigar wrapping devices, the working location of the longitudinal rollers was obtained by adjusting the lengths of the connecting rods which join the roller opening crank arms with their actuating cam lever, thus rendering the working position of the rollers dependable upon the accuracy of fitting the different joints and upon play due to wear. By limiting the motion of the rollers by means of adjustable direct stops, the adjustment is made independent of workmanship and of wear of parts.

Furthermore, in former cigar wrapping devices, the conical flag roller or header cone was mounted so that it approached the head of the cigar in one fixed position, and therefore its entering angle was liable to differ from the end angle of the header block, which in each case conforms to the exact shape of the cigar to be made. By making the entering angle of the flag roller adjustable in the present device, the action of the cone can readily be modified to suit any cigar shape, and the cone will perfectly wrap all shapes. For the purpose of keeping the point of the cone in registration with the tip of the cigar in any angular position of the cone, the bracket which carries the arm of the header cone is slideably mounted on a vertical circular surface provided on, or attached to the frame, the curvature of this surface having its center on a vertical line passing through the apex of the header cone and through the tip of the cigar coincidental therewith.

With these and other objects not specifically mentioned in view, the invention consists of certain constructions and combinations which will be hereinafter fully described and then specifically set forth in the claims hereunto appended.

In carrying the invention into effect, there is provided in a cigar wrapping mechanism, a stationary shaft having opposed brackets pivoted thereon, a side roller and top roller carried by each bracket, with their lines of contact with a bunch equidistantly spaced from the corresponding rollers of the other bracket, and means are provided for moving said brackets toward and away from each other. In the best constructions, a group of tuck rollers are also supported by the stationary shaft. In the best constructions also, each of the brackets is in two parts, pivotally and adjustably connected on the axis of its side roller, each being independently adjustable to bear against a bunch with selected pressure. The best constructions also include a flag roller acting on a bunch between the side and top rollers, and include a mount for said roller, the roller and mount being adjustable in different directions. In the best constructions also, there is provided an aligner for positioning a bunch between the rollers. These means may be widely varied in construction within the scope of the claims, for the particular machine selected to illustrate the invention is but one of many possible concrete embodiments of same. The invention, therefore, is not to be restricted to the specific embodiment shown and described.

Figure 1:
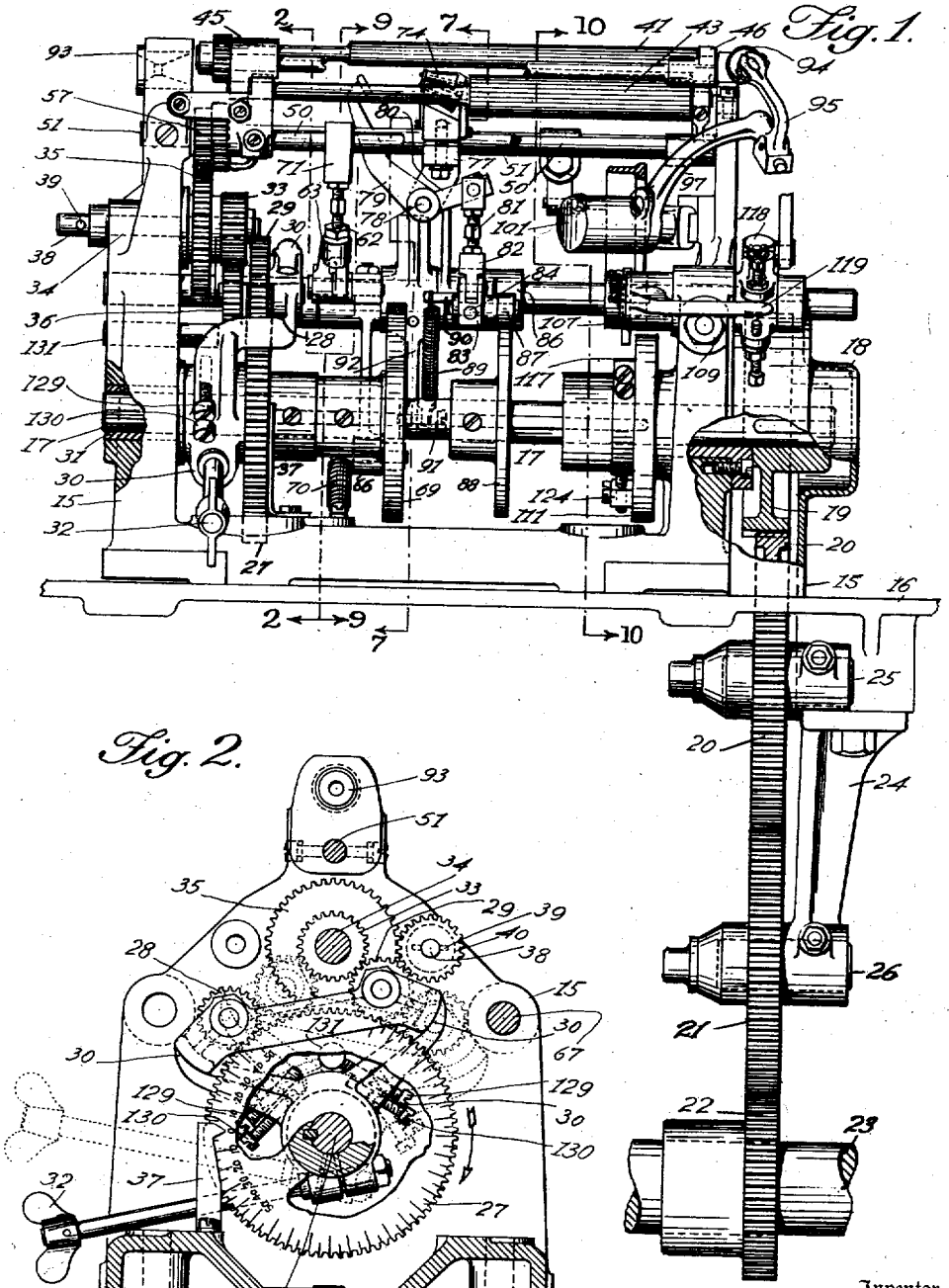
Fig. 1 is a side elevation, with certain parts broken away, of a cigar wrapping mechanism embodying the above mentioned improvements.
Figure 2:
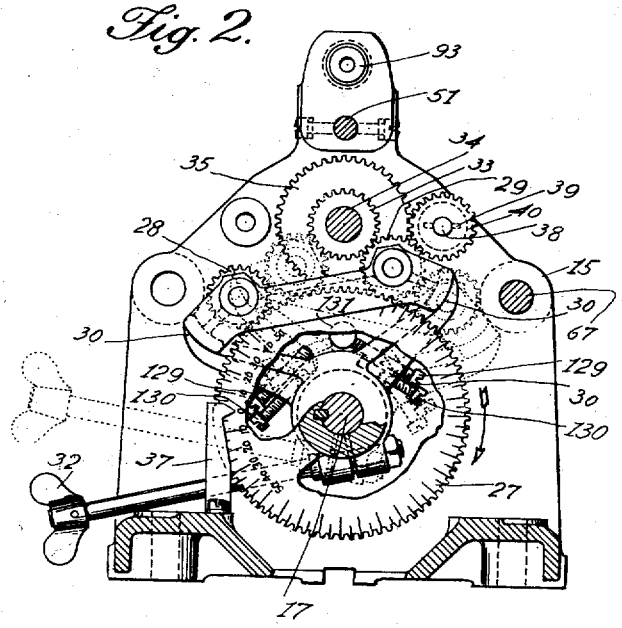
Fig. 2 is a sectional view of a portion of the same with certain parts broken away, on line 2—2 of Fig. 1, showing the arrangement of the drive of the rolling unit.
Figure 3:
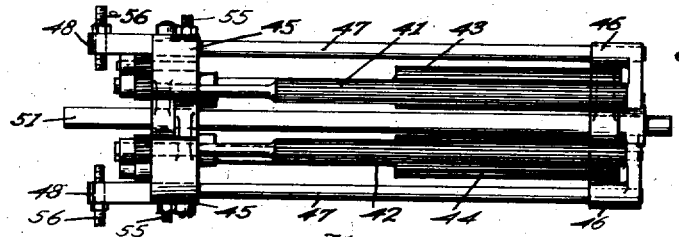
Fig. 3 is a fragmentary top view showing the rolling unit.

Referring to Figs. 1 and 2, the various parts of the wrapper applying device are carried by a frame 15, which is mounted on the table 16 of the cigar machine. A cam shaft 17, in the housing 18 of the frame 15, has a spur gear 19 which is driven by gears 20, 21 and 22, from the drive shaft 23 of the cigar machine, a bracket 24 attached to the under side of the table 16 carrying studs 25 and 26 of the gears 20 and 21, respectively.

The motion from cam shaft 17 is transmitted by a spur gear 27 to pinions 28 and 29 carried by a bracket 30 clamped to a bushing 31 of the shaft 17 by a bolt 32. In the position shown in full lines in Fig. 2, the overhanging face of pinion 29 is in mesh with gear 33 on stud 34, and through gear 35 mounted on the same stud, drives the rollers. In the dotted line position obtained by raising bolt 32 secured to bracket 30, the pinion 36 mounted side by side, or made in one with the pinion 28 but having one tooth less than pinions 28 or 29, meshes with gear 33 and thus drives the gear 35 at a correspondingly lower speed sufficient to regulate the rolling speed of the cigar to suit the stretch required on different grades and conditions of wrappers. The gear 27 is provided with degree graduations, and a pointer 37 is attached to the frame so as to facilitate the exact timing of the cams mounted on shaft 17. The bracket 30 carries the stop screws 129 with lock screws 130, which are adjusted to limit its motion in either direction by engaging a stop pin 131 attached to the frame 15, when the gears are in proper meshing position.

On the stud 38, supported in frame 15 and having the cross pin 39 for engagement with a slotted crank handle, is mounted a gear 40 in mesh with the gear 35, so that the gear 40 may be turned by hand from that crank handle for the purpose of turning the cam shaft 17 when assembling and adjusting the device.

The rolling unit, Figs. 3 to 7, consists of top rollers 41 and 42, and side rollers 43 and 44. The top rollers are carried by brackets 45 at the drive end and by brackets 46 at the other end, which brackets are held together by tie rods 47 and pivoted on the ends of the respective side rollers 43 and 44. The latter, in turn, are carried by brackets 48 at the drive end and 49 at the opposite end, joined by tie rods 50 and pivoted on a stationary supporting shaft 51. The brackets 45 in downwardly projecting lugs having sockets, carry the pins 52 which are connected by coil springs 53 to the bent pins 54 held in sockets of the brackets 48. The brackets 48 carry stop screws 55 and 56 engaging respectively brackets 45 and frame 15, by the setting of which the distances apart of the top and side rollers, respectively, are adjusted for different thicknesses of cigars. On the shaft 51 are loosely mounted gear wheels 57 and 58, which are pinned together or may be made in one, the gear 57 meshing with the gear 35 on stud 34 (Fig. 1), and the gear 58 meshing with gears 59 mounted on the shafts of the side rollers 43 and 44, thereby transmitting motion to each top and side roller, the gears 59 being in mesh with intermediate gears 60 mounted on studs in brackets 45, and the intermediate gears in turn meshing with gears 61 of the upper rollers 41 and 42. The carrying brackets 45, 46, 48 and 49 are so dimensioned that the top rollers bear against the cigar at the same angles with respect to the surface of the cigar as the bottom rollers, so that the pressure exerted by one pair equalizes that of the other pair, and there is no tendency for the cigar to move out of position during the wrapping process.

The mechanism for opening and closing the rollers, to admit the cigar to be wrapped and to permit it to be taken away after wrapping, consists of adjustable rods 62 attached to brackets 63 and 64 which are pivoted on a stud 65 carried by one arm of a cam lever 66 which is pivoted on a stationary fulcrum shaft 67, and on its other arm carries a roller 68 held in engagement with a cam 69 on shaft 17 by a spring 70 attached to the frame 15. The rods 62 are attached to blocks 71, which are strung on the tie rods 50, so that when the lever 66 is lowered by cam 69 into the dotted position shown in Fig. 7, the tie rods 50 are pulled down by the rods 62, thereby turning the brackets 48 and 49 about the shaft 51, and thus spreading the rollers apart.

Figure 4:
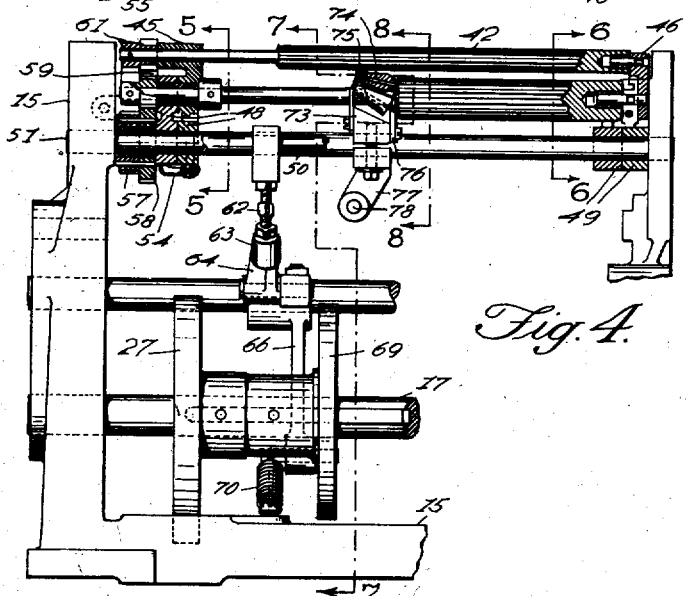
Fig. 4 is a fragmentary side elevation, partly in section, of the rolling unit.
Figure 5:
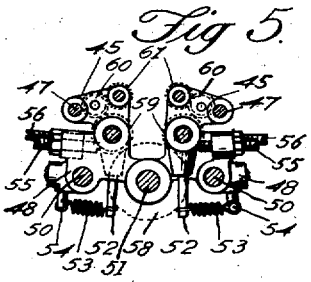
Fig. 5 is a fragmentary view of a section on the line 5—5 in Fig. 4, showing the arrangement of the roller supports at the driving end of the rolling unit.
Figure 6:
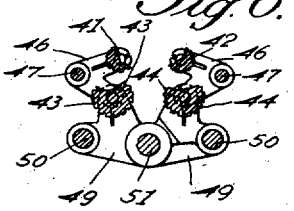
Fig. 6 is a fragmentary view with certain parts broken away of a section on the line 6—6 of Fig. 4, showing the roller supports at the other end of the rolling unit.
Figure 7:
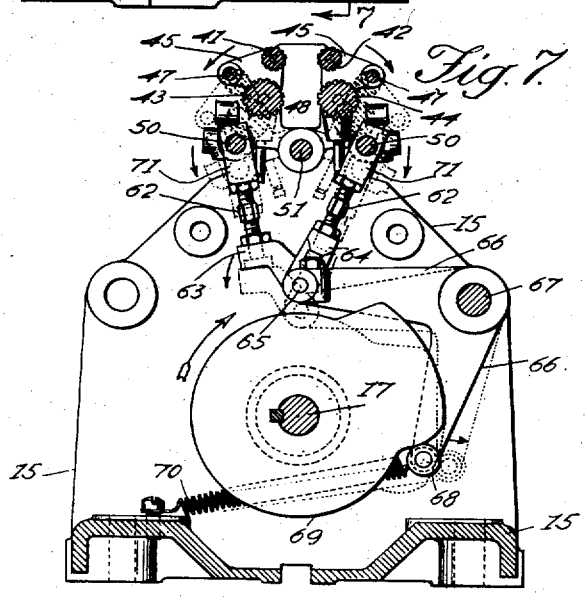
Fig. 7 is a fragmentary view of the section on line 7—7 of Fig. 4, showing the mechanism for opening and closing the rolling unit.
Figure 8:
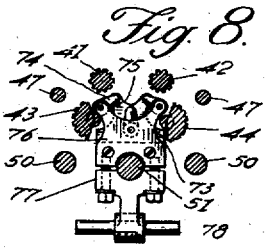
Fig. 8 is a fragmentary view with certain parts broken away of a section on line 8—8 of Fig. 4, showing the tuck roller and the manner of its mounting upon the central supporting rod of the rolling unit.

While the cigar is being revolved by the rollers, its ends rest in the stationary header block 72 (Figs. 10 and 11) and on the tuck support 73 (Figs. 4 and 8). The header block 72 is a form piece made specially for each cigar shape, and is stationarily attached to the frame 15. The tuck support consists of conical rollers 74 arranged to conform with each individual cigar shape and supported by end plates 75 and 76 carried by the support block 73 which is clamped to the shaft 51 by means of a saddle piece 77, which at its lower end carries a shaft 78 on which swings a cam operated arm which engages the tuck end of each incoming cigar bunch after being inserted between the rollers and pushes it into position longitudinally just before the rollers close down upon it.

Figure 9:
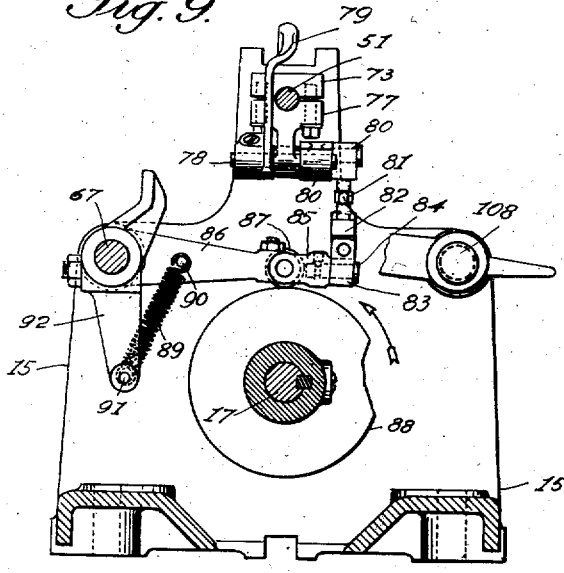
Fig. 9 is a fragmentary view of a section on line 9—9 of Fig. 1, showing the cigar tuck positioning mechanism.

The bunch positioner, Figs. 1 and 9, consists of a bent arm 79 mounted on one end of the shaft 78, which on its other end carries a crank 80 connected by an adjustable rod 81 to a block 82 which is hinged to a block 83 pivoted on stud 84 carried by an offset 85 of crank lever 86, which is fulcrumed on the stationary rod 67 carried by frame 15 and has mounted on it a roller 87 held in engagement with a cam 88 on the shaft 17 by spring 89 attached to a pin 90 in lever 86 and anchored to pin 91 of a stationary arm 92 clamped to fulcrum shaft 67.

After the bunch is in position, the wrapper is started on the bunch by the usual cam actuated tuck needle (not shown), which enters through the double-conic bushing 93 inserted in frame 15 and comes down upon the end of the incoming wrapper, which is guided at the proper angle upon the cigar bunch by the well known tensioning device (not shown) of the cigar machine, and holds it against the tuck end of the cigar so that the wrapper winds spirally around the bunch from its tuck end to its head as the bunch is being revolved by the rolling unit.

Figure 12:
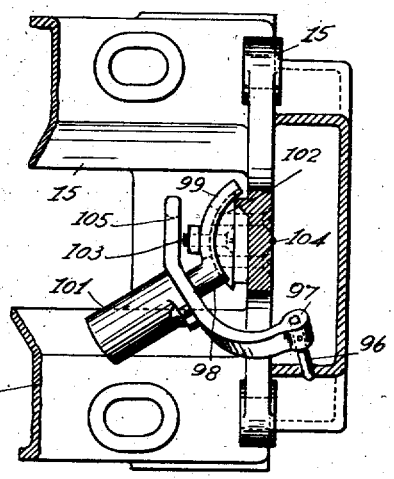
Fig. 12 is a fragmentary top view in section on the line 12—12 of Fig. 11, showing the adjustable arrangement of the header cone.
Figure 10:
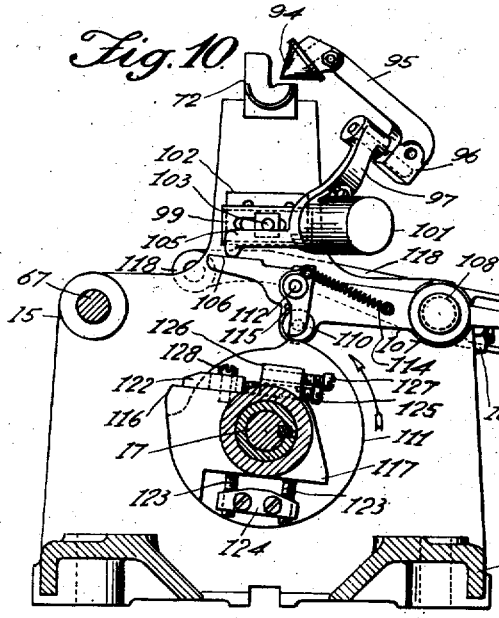
Fig. 10 is a fragmentary sectional view of the cigar head rolling mechanism, on line 10—10 of Fig. 1.
Figure 11:
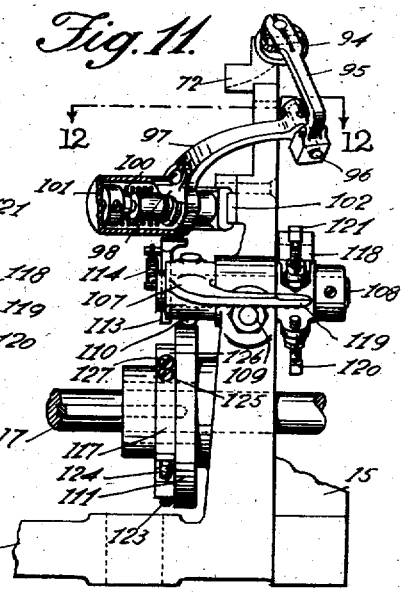
Fig. 11 is a side elevation of a portion of the device, partly broken away, showing the head rolling mechanism.

The header unit, Figs. 10, 11 and 12, consists of the adjustable header cone 94 carried by an arm 95, which is clamped to a stud 96 held by arm 97. The bored enlargement on the end of arm 97 which receives stud 96 in arm 95 is set at such an angle that the axis of the stud passes through the cigar tip. The arm 97 is resiliently pivoted on the pin 98, extending radially from an arcuate bracket 99 by means of the coil spring 100 in housing 101. The bracket 99 has a grooved arcuate base, which engages slidingly with the circular face of a block 102 attached to the frame 15, and is secured in the desired position by tightening the nut of a screw 103 carried by the block 102 and passing through a slot in the base of the bracket 99. The center 104 (Fig. 12) of the arcuate surface of block 102 lies in the vertical line passing through the point of the cone 94, when in contact with the tip of the cigar, so that the coincidence of the cone point with the cigar tip is maintained in any position of bracket 99, that is to say, for any angle of the cigar tip.

The arm 97 has an inward extension 105, the downwardly extending tip of which rests on the surface 106 of a cam lever 107 fulcrumed on a stud 108 held by a screw 109 in the frame 15 and having a roller 110 in engagement with a cam 111 on the shaft 17. The spring 100 which presses the header cone 94 against the cigar, also holds the roller 110 in engagement with the cam 111. On a stud 112 in the cam lever 107 is pivoted a finger 113 which is pulled by a spring 114 against a stop 115, which holds it in position to engage with the nose 116 of an adjustable cam 117. When this nose passes under finger 113 from the direction of the arrow shown in Fig. 10, the lever 107 is lifted from cam 111, thereby raising the header cone 94 from the cigar and clearing the way for the approach of the flag cutter (not shown) of the cigar machine, the movement into cutting position and driving of which are controlled through means not shown, by the action of lever 118, fulcrumed on stud 108, the actuating end of which lever is raised by the arm 119 of lever 107 engaging with the lower stop screw 120 in the fork end of lever 118. After the nose 116 has passed the finger 113, the cam lever 107 drops until stopped by the upper stop screw 121, causing withdrawal of the flag cutter after the latter has performed its function, and bringing the header cone back into rolling position. As the nose 116 passes from under finger 113, the latter drops onto an adjustable stop 122 which takes the shock of the impact, while the header cone 94 is still some distance from the cigar so that, upon further motion of the cam shaft, the header cone approaches the cigar gradually, without danger of injuring the wrapper. The position of cam 117, for the correct timing of the cutting action, is adjusted by means of screws 123 carried by a block 124 attached to the cam 111. The position of stop 122, which governs the distance from which the header cone commences its gradual motion towards the cigar for the final rolling of the flag, is adjusted by a screw 125 in a lug 126 of the cam 117, this adjusting screw then being locked in position by a screw 127 also carried by the lug 126, the stop 122 being secured by a screw 128 to the cam 117, this screw passing through a slot provided in the stop.

What is claimed is:

1. In cigar wrapping mechanism, the combination with a stationary shaft, of opposed brackets pivoted on said shaft, a side roller and a top roller carried by each bracket with their lines of contact with a bunch equidistantly spaced from the corresponding rollers of the other bracket, and a group of tuck rollers supported by said shaft.

2. In cigar wrapping mechanism, the combination with a stationary shaft, of opposed brackets pivoted on said shaft, a side roller and a top roller carried by each bracket with their lines of contact with a bunch equidistantly spaced from the corresponding rollers of the other bracket, a saddle carried by said shaft, and a group of tuck rollers carried by said saddle.

3. In cigar wrapping mechanism, the combination with a stationary shaft, of opposed brackets pivoted on said shaft, a side roller and a top roller carried by each bracket with their lines of contact with a bunch equidistantly spaced from the corresponding rollers of the other bracket, each of said brackets being in two parts pivotally and adjustably connected on the axis of its side roller and each being independently adjustable to bear against a bunch with selected pressure.

4. In cigar wrapping mechanism, the combination with a stationary shaft, of opposed brackets pivoted on said shaft, a side roller and a top roller carried by each bracket with their lines of contact with a bunch equidistantly spaced from the corresponding rollers of the other bracket, and a flag roller acting on a bunch between said rollers and mounts therefor which are adjustable in different directions.

5. In cigar wrapping mechanism, the combination with a stationary shaft, of opposed brackets pivoted on said shaft, a side roller and a top roller carried by each bracket with their lines of contact with a bunch equidistantly spaced from the corresponding rollers of the other bracket, a saddle on said shaft, a flag roller arm mounted on said saddle and acting on a bunch between said rollers, and cam actuated linkage operating said arm.

6. In cigar wrapping mechanism, the combination with a stationary shaft, of opposed brackets pivoted on said shaft; a side roller and a top roller carried by each bracket with their lines of contact with a bunch equidistantly spaced from the corresponding rollers of the other bracket, and an aligner for positioning a bunch between said rollers.

7. In cigar wrapping mechanism, the combination with a stationary shaft, of opposed brackets pivoted on said shaft, a side roller and a top roller carried by each bracket with their lines of contact with a bunch equidistantly spaced from the corresponding rollers of the other bracket, and a cam actuated arm for positioning a bunch between said rollers.

8. In a cigar wrapping mechanism, the combination with a support, of opposed brackets pivoted on said support, a side roller and top roller carried by each bracket and arranged to engage a cigar bunch located between the rollers on the respective brackets, each of said brackets being articulated intermediate the pivot point and the top roller to allow the top roller movement independent of the side roller.

9. In a cigar wrapping mechanism, the combination with a support, of opposed brackets pivoted on said support, a side roller and a top roller carried by each bracket and arranged to engage a cigar bunch located between the rollers on the respective brackets, each of said brackets being articulated intermediate the pivot point and the top roller to allow the top roller movement independent of the side roller, the pivot points of said opposed brackets being located on the same axis substantially parallel to the axis of the cigar.

10. In a cigar wrapping mechanism, the combination with a support, of opposed brackets pivoted on said support, a side roller and a top roller carried by each bracket and arranged to engage a cigar bunch located between the rollers on the respective brackets, each of said brackets being articulated intermediate the pivot point and the top roller to allow the top roller movement independent of the side roller, devices maintaining said side rollers in contact with the bunch, and devices yieldingly urging said top rollers against the bunch.

11. In a cigar wrapping mechanism, the combination with a support, of opposed brackets pivoted on said support, a side roller and a top roller carried by each bracket, said side rollers and top rollers being each arranged to engage a cigar bunch located between the rollers on the respective brackets, each of said brackets being in two parts pivotally connected on the axis of said cigar engaging side roller to support the top roller on the bracket for movement independent of the side roller, and means rotating said rollers while the same are in engagement with the bunch to rotate said bunch.

12. In a cigar wrapping mechanism, the combination with a shaft, of opposed brackets pivoted on said shaft, a side roller and a top roller carried by each bracket and arranged to act on a cigar bunch located between the rollers on the respective brackets, each of said brackets being in two parts pivotally connected on the axis of its side roller.

13. In a cigar wrapping mechanism, the combination with a support, of opposed brackets pivoted on said support, a side roller and a top roller carried by each bracket and arranged to engage a cigar located between the rollers on the respective brackets, each of said brackets being in two parts pivotally connected at a position between said top roller and the point of pivoting on said support, to permit independent movement of the top and side rollers toward the cigar, devices urging each of said rollers into contact with the cigar, and separately adjustable stops for individually limiting the movement of each of said rollers toward the cigar.

14. In a cigar wrapping machine, the combination with means mounting a pair of side rollers for movement toward and away from each other to engage a cigar bunch between them, of mechanism for mounting a pair of top rollers for movement toward each other, to engage said cigar bunch from either side, devices urging each of said top rollers into contact with the cigar and adjustable stops for the top rollers limiting the movement of the top rollers toward the cigar independently of the side rollers.

15. In a cigar wrapping mechanism, the combination with a pair of opposed brackets, of means mounting said brackets for movement toward and away from each other, rollers carried by said brackets, a flag roller arranged to act on a bunch located between said rollers, and a mount for the flag roller mounting the flag roller for adjustment in a circular path about an axis passing through the tip of the head end of a cigar being acted on by said rollers.

16. In a cigar wrapping mechanism, the combination with a pair of opposed brackets, of means mounting said brackets for movement toward and away from each other, rollers carried by said brackets, a conical flag roller arranged to act on a bunch located between said rollers, with the tip of the head end of the bunch substantially in contact with the tip of the cone, and a mount for the flag roller mounting the flag roller for adjustment in a circular path about a vertical axis passing through the tip of the head end of a cigar being acted on by said rollers.

17. In a cigar wrapping mechanism, the combination with a shaft, of opposed brackets pivotally mounted on the same axis parallel to the length of the cigar, rollers carried by the brackets arranged to engage a cigar bunch located between them, and a group of tuck rollers arranged to engage the tuck end of said bunch supported for adjustment on the same axis as that on which the brackets are pivoted.

18. In a cigar wrapping mechanism, the combination with a shaft, of opposed brackets pivoted on said shaft, rollers carried by said brackets, and a locating element movably mounted on said shaft for engagement with the tuck end of a bunch between said rollers to position the bunch.

19. In a cigar wrapping mechanism, the combination with a support, of opposed brackets pivoted on said support, a side roller and a top roller carried by each bracket and arranged to engage a cigar bunch located between the rollers on the respective brackets, a plurality of gears on each of said brackets connecting said side and top rollers, each of said brackets being in two parts pivotally connected on the axis of one of said gears to support the top roller on the bracket for movement independent of the side roller, without interfering with operation of the gearing.

JOHN F. HALSTEAD.